United States Patent [19]

Stramel

[11] Patent Number: 5,199,982
[45] Date of Patent: Apr. 6, 1993

[54] PROCESS TO MANUFACTURE COLORED PIGMENTS BASED ON ZIRCON

[75] Inventor: Rodney D. Stramel, Edmond, Okla.

[73] Assignee: Kerr-McGee Chemical Corporation, Oklahoma City, Okla.

[21] Appl. No.: 874,132

[22] Filed: Apr. 24, 1992

[51] Int. Cl.$^5$ .......................... C01B 33/20; C08K 3/00
[52] U.S. Cl. ...................................... 106/451; 423/326
[58] Field of Search ................ 423/326; 106/450, 451; 501/102

[56] References Cited

U.S. PATENT DOCUMENTS

| | | | |
|---|---|---|---|
| 3,510,332 | 5/1970 | Weber | 106/299 |
| 3,589,925 | 6/1971 | Bell | 106/299 |
| 3,640,745 | 2/1972 | Darr et al. | 106/300 |
| 3,756,840 | 9/1973 | Gascon | 106/299 |
| 3,899,347 | 8/1975 | de Ahna et al. | 106/299 |
| 5,032,420 | 7/1991 | Shobert et al. | 427/28 |

OTHER PUBLICATIONS

WPI/Derwent Abstract 78-23485A/13 of DE2642143.
WPI/Derwent Abstract 78-34775A/19 of SU 560843.
WPI/Derwent Abstract 79-003743/31 of RO 66383.
WPI/Derwent Abstract 79-72995B/40 of JP 79027767.

*Primary Examiner*—Mark L. Bell
*Assistant Examiner*—Paul Marcantoni
*Attorney, Agent, or Firm*—Herbert M. Hanegan

[57] ABSTRACT

A process for making colored pigments based on zircon is described whereby a mixture of zirconium halide, silicon halide and a metal halide chromophore are oxidized at a temperature in the range of from about 600° to about 1400° C. This combustion process may be conducted in much less time than prior art procedures which calcine zirconium oxide, silicon oxide and a chromophore. Additionally, the resultant particles are sufficiently small to enable the pigment to be used immediately without need for a subsequent grinding or pulverization step, as typically required by the prior art.

12 Claims, No Drawings

PROCESS TO MANUFACTURE COLORED PIGMENTS BASED ON ZIRCON

FIELD OF THE INVENTION

The invention relates to processes for making pigments, and in one aspect, more particularly relates to processes for making pigments by oxidation or combustion procedures. Still more particularly, in another aspect, the invention relates to making pigments by oxidizing metal halides, particularly zirconium halides.

BACKGROUND OF THE INVENTION

Current processes for making pigments useful in coloring ceramics, plastics and glass require calcination of the reactants, usually metal oxides, at high temperatures for relatively long periods of time. The calcination process is then followed by a grinding process to produce a powder fine enough to be carried by the vehicle. It would be advantageous if a method for making pigments could be devised which did not require long reaction times and high temperatures, and/or a separate grinding step.

Processes for the production of zirconium-silica based pigments using high temperature calcination of oxides in the presence of a chromophore and a mineralizer component are described in a number of publications. For example, U.S. Pat. No. 3,510,332 outlines a process for the production of zirconium-praseodymium yellow pigments from zirconium silicates without separating sodium silicate. The first step is the decomposition of zirconium-silicate by heating an alkali-zirconium silicate mixture to temperatures of 800°–1200° C. In the second step, an aqueous slurry of the decomposed product is formed by mixing the decomposed product with water in a molar ratio of water to zirconium silicate of from about 5:1 to 20:1, and with a praseodymium compound in an amount, sufficient to form the yellow pigments. The third step involves adding a mineral acid to the aqueous liquid slurry in an amount, sufficient to neutralize at least 0.5 alkali equivalents, thereby solidifying the aqueous slurry. The fourth and final step is calcining the solidified mixture at a temperature of from 850° to 1300° C. This patent employs calcination steps which are conducted at high temperatures for relatively long periods of time, which is undesirable for pigment manufacture.

Pigments may also be prepared by calcining mixtures of zirconium and silicon salts in the presence of a chromophore and a mineralizer component. Yellow ceramic pigments containing praseodymium using 1 mole $ZrO_2$, 0.8–1.4 mole $SiO_2$, 0.06–0.04 mole flouride, 0.1–3.5 mole chloride, 0.1–0.4 mole Pr and with water equal to 0.5–10 times the moles of chloride employed are described in WPI/Derwent Abstract 78-23485A/13 of DE 2642143. The Abstract states that water may be added as such, or be present in the compounds used in the mixture, which may also contain 0.01–0.1 mole of an alkali nitrate per mole chloride. The mixture is preferably calcined 0.5–3 hours at 820°–980° C. and the resulting products are employed to manufacture glazes.

U.S. Pat. No. 3,589,925 teaches that zircon based ceramic pigments may be prepared by calcining mixtures comprising zirconium and silicon oxide (or compounds capable of yielding these materials on calcination) in the presence of a chromophore and one or more mineralizer components, the proportions of zirconium oxide (zircon) and silica in the mixture being such that zirconium silicate is formed on calcination. Blue and yellow pigments may be formed by calcining mixtures of the type described above in which the coloring agents are, respectively, vanadium pentoxide and praseodymium oxide and in which, in each case, mineralizer components comprising the sources of alkali metal ions, fluoride ions and either chloride or bromide ions are now employed. The discovery of the patent is that ceramic pigments may have still further enhanced color strength by calcining mixtures of the type described above, in which the mineralizer components include a source of barium ions, in addition to sources of alkali metal ions, fluoride ions and either chloride or bromide ions.

Yellow zirconium silicate ceramic pigment may be prepared by calcining a mixture of zirconyl hydroxide, quartz, praseodymium oxide and a mineralizer, according to the title of WPI/Derwent Abstract 79-003743/31 of RO 663383. Similarly, there is WPI/Derwent Abstract 79-72995B/40 of JP 79027767 which describes transfer paper giving a clear red color by heating at high temperature. On a transcription paper substrate are formed an adhesive layer and a yellow pigment layer containing vanadium and zirconium, and an additional pigment layer containing pink color pigment. It is not mentioned in the Abstract how the yellow pigment color is made. Nevertheless, it continues to be seen from these publications that calcining is considered a necessary step in pigment formation.

Zirconium dioxide-silicon dioxide-praseodymium oxide ceramic pigments have added thereto 0.01 to 10% of an oxide of antimony, niobium, bismuth and/or tantalum according to U.S. Pat. No. 3,899,347. Once again, however, calcining and grinding steps are necessary to achieve the pigment of this patent.

Another process requiring calcining is described in U.S. Pat. No. 3,756,840. It mentions the preparation of praseodymium yellow zircon-based pigments by calcining silicozirconate, zirconium sulfate, a mineralizer and praseodymium oxide at a temperature below 900° C. The silicozirconate is present in a stoichiometric excess; e.g. 10–50 molar percent, with respect to the basic zirconium sulphate. The zirconium sulfate is preferably of formula $(ZrO_2)_2.SO_3$ and may be prepared by reacting the silicozirconate with sulphuric acid. Glazes containing the pigments are of superior quality to those containing pigments derived from smaller quantities of silicozirconate, it is stated.

U.S. Pat. No. 5,032,420 discloses a method for applying a yellow incandescent bugfoiler pigment coating comprising a fine-ground blend of praseodymium doped zirconium silicate and silica. This cadmium-free blend is preferably applied electrostatically in three coats to the interior of a bulb to diffuse the light and block the emitted UV wavelengths. The method of making the pigment is not disclosed.

Yellow ceramic pigment compositions with chemical resistance containing silicon, aluminum, calcium, sodium, potassium, cerium, praseodymium and zirconium dioxide are described in WPI/Derwent Abstract 78-34775A/19 of SU 560843. The yellow ceramic pigment composition comprises (in wt. %): $SiO_2$ 50.21–61.94; $Al_2O$ 9.15–11.26; CaO 0.52–0.64; $Na_2O$ 3.37–4.15; $K_2O$ 1.74–2.14; $CeO_2$ 2.0–6.0; $Pr_2O_3$ 2.0–9.0; $ZrO_2$. The addition of $CeO_2$ and $Pr_2O_3$ are defined as culturing agents and additional $ZrO_2$ give yellow production with improved chemical resistance and reduced firing temperature (1050°–1100° C.). Preparation of the pigment is not further discussed within these publications, however.

U.S. Pat. No. 3,640,745 describes the preparation of agglomerated pigmentary titanium dioxide by vapor phase oxidation of titanium halide in a reaction chamber at elevated temperatures in the presence of controlled amounts of alkali metal cation and auxiliary gas. The production of superfine oxide powders by flame hydrolysis in a burner or by hydrothermal synthesis is described by G. W. Kriechbaum, et al. in "Superfine Oxide Powders—Flame Hydrolysis and Hydrothermal Synthesis," *Angew. Chem. Ind. Ed. Eng. Advanced Materials*, Vol. 28, No. 10, 1989 pp. 1416–1423.

SUMMARY OF THE INVENTION

Accordingly, it is an object of the present invention to provide a process for producing colored pigments for ceramics, plastics, glass, and the like.

It is another object of the present invention to provide a process for producing colored pigments which does not require calcining at high temperatures for long periods of time.

Still another object of the present invention to disclose a method for the production of colored pigments by combustion synthesis.

Another object of the present invention is to provide a process for producing colored pigments which does not require a grinding or pulverizing step of the pigment to convert it to a useable powder.

In carrying out these and other objects of the invention, there is provided, in one form, a process for producing metal zircon pigment particles involving first, mixing a zirconium halide, a silicon halide and metal halide chromo-phore with oxygen. Secondly, the halides are oxidized at a temperature in the range of from about 600° to about 1400° C. to convert the halides to oxides and elemental halogen. Finally, the metal zircon pigment particles are recovered.

DETAILED DESCRIPTION OF THE INVENTION

It has been discovered that a zircon pigment may be prepared by combustion of $ZrCl_4$ and $SiCl_4$ in the presence of $PrCl_3$ to obtain a yellow colored pigment, or the combustion of $ZrCl_4$ and $SiCl_4$ in the presence of $VOCl_3$ to obtain a blue colored pigment. Zircon has the formula $ZrSiO_4$ or $ZrO_2.SiO_2$.

In general, a zirconium halide, a silicon halide and a metal halide which serves as a chromophore are mixed together with an oxygen source and then oxidized to give zircon-based pigment particles. The oxidation step is conducted at a temperature in the range of about 600° to about 1400° C.; preferably from about 900° to about 1200° C. The oxidation may be conducted at or above atmospheric pressure.

Although any halogen atom may be used, chlorine is preferred, primarily because the starting compounds using it are relatively inexpensive compared to those employing the other halogens. While it is possible that the halogen atoms for each component may be different, e.g. using $ZrCl_4$ with $SiBr_4$, it is preferred that the halogen atoms be the same for each halide in a particular synthesis so that the biatomic halogen molecules co-produced in the inventive process are all of one species and may be subsequently processed easily.

As noted, the particles resulting from the oxidation reaction of this invention may have diameters of from about 0.03 to about 20 micrometers, most preferably from about 0.1 to about 5 micrometers. Because particles of this size are suitable for pigment powder, no subsequent grinding or pulverizing procedure is required.

In general, the molar ratio of the silicon halide to zirconium halide (the latter taken as 1) ranges from about 0.8:1 to about 1.4:1. The molar ratio of the metal halide chromophore to zirconium halide is from about 0.1:1 to about 0.4:1 and the molar ratio of oxygen to zirconium halide is from about 1.9:1 to about 2.8:1 or greater, up to about 3.1:1 or greater. Too large a proportion of oxygen may give concerns with respect to oxygen or air handling and/or disposal concerns. The oxygen may be provided as air, pure $O_2$ or mixed with any suitable inert gas, as appropriate, and, as noted, in excess of the necessary stoichiometry.

The flame combustion oxidation process of this invention may be conducted in an annular burner or flame reactor. This process is also termed "combustion synthesis".

The process of this invention may be illustrated by the following equation:

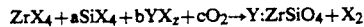
$$ZrX_4 + aSiX_4 + bYX_z + cO_2 \rightarrow Y:ZrSiO_4 + X_2$$

where
- X is a halogen atom selected from the group consisting of fluorine, chlorine and bromine,
- Y is a metal selected from the group consisting of praseodymium and vanadium; when Y is vanadium, it may represent the moiety VO in $VOCl_3$,
- a ranges from about 0.8 to about 1.4,
- b ranges from about 0.1 to about 0.4,
- c ranges from about 1.9 to about 3.1, and
- z is sufficient to satisfy the valence of Y.

As noted, where Y is praseodymium, a yellow pigment is produced; when Y is vanadium, a blue pigment is made. The resulting $Y:ZrSiO_4$ pigment may be term a zircon-based pigment due to the presence of $ZrSiO_4$ ($ZrO_2.SiO_2$).

The invention will be described more fully by the following Example, which is intended to be illustrative only and not restrictive upon the scope of the invention.

EXAMPLE 1

Into an annular burner, the following ingredients would be fed: 23 g of $ZrCl_4$ (0.1 moles) per hour, 17 g of $SiCl_4$ (0.1 moles) per hour, and 10 g of $PrCl_3$ (0.04 moles) per hour and oxygen, 15 g or 11 liters per hour, at a temperature of 1100° C. Yellow particles of $Pr:ZrSiO_4$ would be produced immediately. It is expected that the particles would have diameters of about 0.1 to about 5.0 micrometers, suitable to be used directly as pigments without further grinding or pulverization. The production of the metal zircon particles is substantiated by the results in U.S. Pat. No. 3,640,745 and G. W. Kriechbaum, et al. in "Superfine Oxide Powders-Flame Hydrolysis and Hydrothermal Synthesis," *Angew. Chem. Ind. Ed. Eng. Advanced Materials*, Vol. 28, No. 10, 1989 pp. 1416–1423, both incorporated by reference herein. A similar Example using an equivalent amount of $VOCl_3$ in place of the $PrCl_3$ would give metal zircon pigment particles of a blue color.

As taught by the prior art, the pigments of this invention may be used to colorize glazes, U.S. Pat. No. 3,756,840; 3,589,925; add color to ceramics, U.S. Pat. Nos. 3,510,332; 3,589,925 and 3,899,347; and as colored coatings on the interior of light bulbs, U.S. Pat. No.

5,032,420. All of these patents are hereby incorporated by reference.

The advantages of this invention include the ability to make pigments in vastly decreased time; in milliseconds v. hours. Further, the inventive process will produce pigment particles immediately, without any need for grinding them into powder, thus further saving time and capital investment. Further, using pigments prepared by this process would be considered environmentally friendly and could replace the CdS yellow pigments currently used; cadmium is considered a carcinogen and a hazardous waste material. The pigments from this process are expected to be stable at high processing temperatures and could be used in a variety of colorant applications.

Many modifications may be made in the inventive process without departing from the scope of the invention which is set forth only in the claims. For example, one of ordinary skill in the art could use different chromophores than those mentioned here to obtain different colors than those specifically mentioned. Additionally, extra $SiCl_4$ or $ZrCl_4$ chlorides or other additives may also be used to change the properties of the resultant pigment.

I claim:

1. A process for producing metal zircon pigment particles comprising the steps of:
   mixing a zirconium halide, a silicon halide and metal halide chromophore with oxygen, where the metal halide chromophore is selected from the group consisting of praseodymium halide, vanadium halide and mixtures thereof;
   oxidizing the halides at a temperature in the range of from about 600° to about 1400° C. to convert the halides to oxides and elemental halogen; and
   recovering metal oxide pigment particles.

2. The process of claim 1 where the oxidation temperature is in the range of from about 900° to about 1200° C.

3. The process of claim 1 where the halogen in each of the halides is chlorine.

4. The process of claim 1 where the metal halide chromophore is a praseodymium halide and the resulting metal oxide pigment particles are yellow.

5. The process of claim 1 where the metal halide chromophore is a vanadium halide and the resulting metal oxide pigment particles are blue.

6. The process of claim 1 where the molar ratio of silicon halide to zirconium halide is from about 0.8:1 to about 1.4:1, the molar ratio of metal halide chromophore to zirconium halide is from about 0.1:1 to about 0.4:1, and the molar ratio of oxygen to zirconium halide is from about 1.9:1 to about 3.1:1.

7. The process of claim 1 where the resulting metal oxide pigment particles have a diameter of from about 0.03 to about 20 mircometers.

8. A process for producing metal zircon pigment particles comprising the steps of:
   mixing a zirconium halide, a silicon halide and metal halide chromophore with oxygen, where the metal halide chromophore is selected from the group consisting of praseodymium halide, vanadium halide and mixtures thereof;
   oxidizing the halides at a temperature in the range of from about 600° to about 1400° C. to convert the halides to oxides and elemental halogen according to the equation $$ZrX_4 + aSiX_4 + bYX_z + cO_2 \rightarrow Y{:}ZrSiO_4 + X_2$$

where
   X is a halogen atom selected from the group consisting of fluorine, chlorine and bromine,
   Y is a metal selected from the group consisting of praseodymium, vanadium and mixtures thereof,
   a ranges from about 0.8 to about 1.4,
   b ranges from about 0.1 to about 0.4
   c ranges from about 1.9 to about 3.1, and
   z is sufficient to satisfy the valence of Y; and
   recovering metal zircon Y:$ZrSiO_4$ pigment particles.

9. The process of claim 8 where the halogen atom X is chlorine.

10. The process of claim 1 where the oxidation temperature is in the range of from about 900° to about 1200° C.

11. The process of claim 8 where the resulting metal oxide pigment particles have a diameter of from about 0.03 to about 20 micrometers.

12. A process for producing metal zircon pigment particles comprising the steps of:
   mixing a zirconium halide, a silicon halide and metal halide chromophore with oxygen, where the metal halide chromophore is selected from the group consisting of praseodymium halide, vanadium halide and mixtures thereof;
   oxidizing the halides at a temperature in the range of from about 900° to about 1200° C. to convert the halides to oxides and elemental halogen according to the equation $$ZrCl_4 + aSiCl_4 + bYCl_z + cO_2 \rightarrow Y{:}ZrSiO_4 + Cl_2$$

where
   Y is a metal selected from the group consisting of praseodymium, vanadium and mixtures thereof,
   a ranges from about 0.8 to about 1.4,
   b ranges from about 0.1 to about 0.4,
   c ranges from about 1.9 to about 2.8, and
   z is sufficient to satisfy the valence of Y; and
   recovering metal zircon Y:$ZrSiO_4$ pigment particles having an average diameter of from about 0.03 to about 20 mircometers, in the absence of a subsequent grinding step.

* * * * *